United States Patent [19]

Long

[11] Patent Number: 4,479,713
[45] Date of Patent: Oct. 30, 1984

[54] PHOTOGRAPHIC EXPOSURE MASKS

[75] Inventor: John G. Long, Leatherhead, England

[73] Assignee: Durst (U.K.) Limited, Epsom, England

[21] Appl. No.: 489,201

[22] Filed: Apr. 27, 1983

[30] Foreign Application Priority Data

Jun. 11, 1982 [GB] United Kingdom ............... 8217048

[51] Int. Cl.³ ............................................. G03B 27/58
[52] U.S. Cl. ........................................ 355/74; 355/71
[58] Field of Search .................. 355/74, 90, 72, 73, 355/79, 97, 108, 71; 242/186

[56] References Cited

U.S. PATENT DOCUMENTS

| 3,488,119 | 1/1970 | Dixon et al. | 355/74 |
| 3,689,149 | 9/1972 | Livingood | 355/74 X |
| 3,732,010 | 5/1973 | Harter et al. | 355/74 X |
| 3,807,861 | 4/1974 | Nosco et al. | 355/74 X |
| 4,125,326 | 11/1978 | Baert | 355/74 |
| 4,157,221 | 6/1979 | Raven | 355/74 X |
| 4,324,488 | 4/1982 | Anderson et al. | 355/74 |
| 4,417,810 | 11/1983 | Ueda et al. | 355/74 |

Primary Examiner—Richard A. Wintercorn
Attorney, Agent, or Firm—Cahill, Sutton & Thomas

[57] ABSTRACT

An exposure mask for photographic material has a measuring wheel and two adjustable mask blades. Movement of the photographic material causes rotation of the wheel, which causes a switching member to rotate. Whenever the switching member reaches a given position it operates a switch and stops the transport of the material. Adjustment of one mask blade adjusts the rate of rotation of the switching member relative to that of the measuring wheel by adjusting the axial position of a frustoconical roller that rests on the measuring wheel and drives the switching member.

9 Claims, 6 Drawing Figures

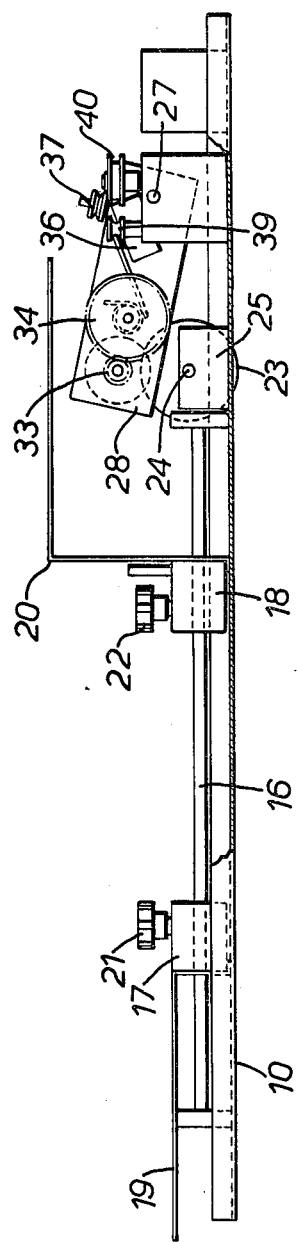
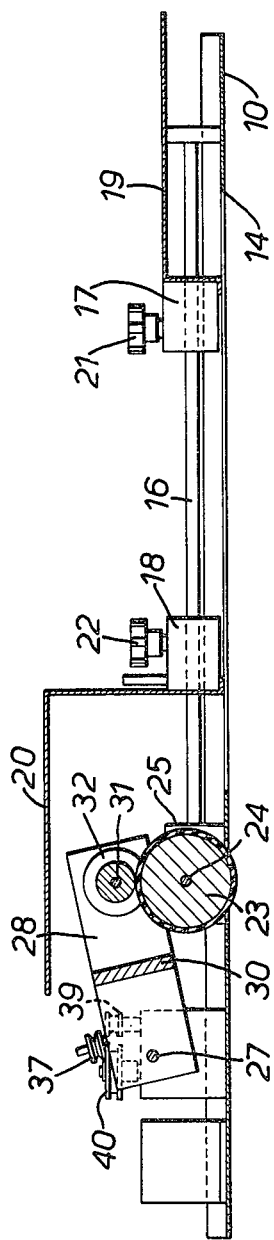

PHOTOGRAPHIC EXPOSURE MASKS

BACKGROUND OF THE INVENTION

1. Field of the Invention

The invention relates to an exposure mask with a measuring wheel and a switching means to control a transport unit for photographic material.

2. The Prior Art

In previously proposed transport units for photographic paper, for example, in photographic roll printing apparatus, the transport distance by which the paper is advanced at the end of each printing operation is measured by means of a measuring wheel attached to a paper mask. The measuring wheel acts on a switching means, for example, a micro-switch, by way of a transmission member, in such a way that a paper transport motor switched on at the start of the transport is switched off after a number of rotations of the measuring wheel corresponding to the desired transport distance. The diameter of the measuring wheel and the transmission member, which may for example contain a gear, are so matched to each other that the transport distance is suitable for the dimensions of the light passage aperture of the paper mask, and therefore the print size which is to be produced. In such previously proposed roll printing apparatus, therefore, a separate mask with a separate transport measuring device, which in each case contains a measuring wheel, is required for each print size. As a result, the user of such apparatus must acquire for each print size required a paper mask which is relatively expensive, particularly owing to the cost of the transport measuring device, but many of these masks, for example, a mask for exposing test strips, are used relatively rarely.

OBJECT OF THE INVENTION

It is an object of the invention to provide an exposure mask which is suitable for a range of print sizes, with the transport being matched in each case to the size of print being produced.

SUMMARY OF THE INVENTION

The invention provides an exposure mask for photographic material comprising a measuring wheel arranged in use to be caused to rotate by the transport of photographic material past the mask, switching means for stopping the transport of the photographic material, a switching member that in use is caused to move cyclically in response to the said rotation of the measuring wheel and is arranged to operate the switching means whenever it reaches a predetermined point in its cycle, and at least one adjustable covering member that in use defines an edge extending transversely of the direction of photographic material transport of an aperture through which light can reach the said photographic material, the arrangement being such that adjustment of the position of the said covering member causes an appropriate adjustment of the ratio of the rate of rotation of the measuring wheel to the rate of said cyclical movement of the switching member. The switching means is advantageously arranged in use to control the transport of photographic material past the aperture of the mask.

The invention also provides a transport unit for photographic material, which is provided with an exposure mask according to the invention, and is arranged to stop transporting material when the switching member operates the switching means.

With an exposure mask according to the invention a large number of standard print sizes can be set, offering the advantage that only a single mask need be acquired in order for the user to be able to produce prints of all current standard sizes up to the dimensions of the maximum light passage aperture of the mask.

An additional advantage arises from the fact that because a mask blade is continuously adjustable, prints of non-standard sizes can also be produced without the need for expensive special masks to be prepared, as was previously the case.

There is a further advantage for the manufacturers of paper transport units and roll printing apparatus, since only a single exposure mask need be provided for a multiplicity of print sizes, and it is no longer necessary to maintain expensive stocks to cover the large number of masks previously required. The handling of delivery orders is also less complicated, since individual print size requirements, which generally differ a great deal from user to user for the most part need no longer be taken into consideration. For a particular roll printing apparatus, one manufacturer supplies over 20 different standard paper masks, which can be replaced by a single mask according to the invention.

One form of exposure mask constructed in accordance with the invention will now be described by way of example with reference to the accompanying drawings, in which:

BRIEF DESCRIPTION OF THE DRAWINGS

FIG. 3 is a side view of the exposure mask, partly cut away;

FIG. 4 is a cross-section on the line Y—Y of FIG. 2;

Figure 1:
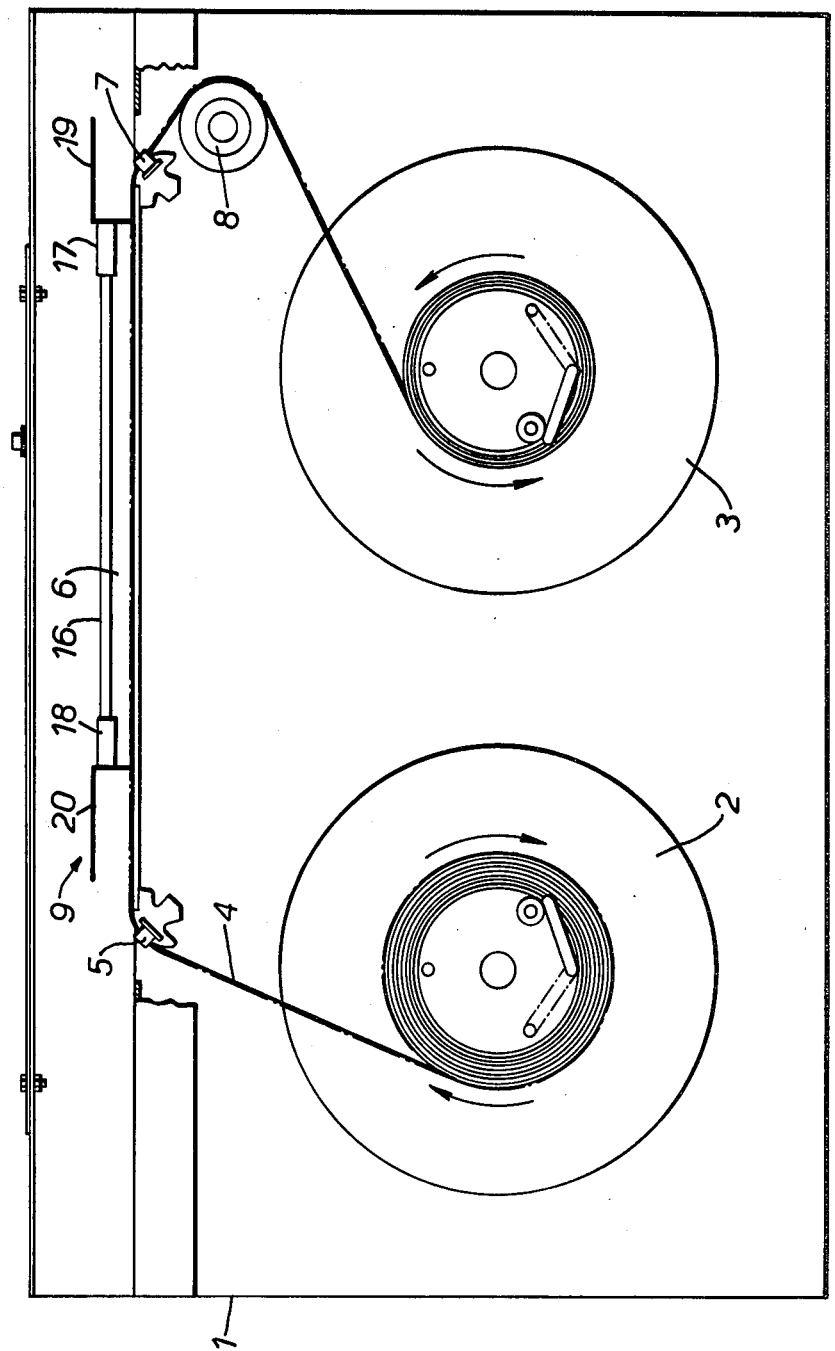
FIG. 1 shows the paper transport unit of a photographic roll printing apparatus fitted with the exposure mask.
Figure 2:
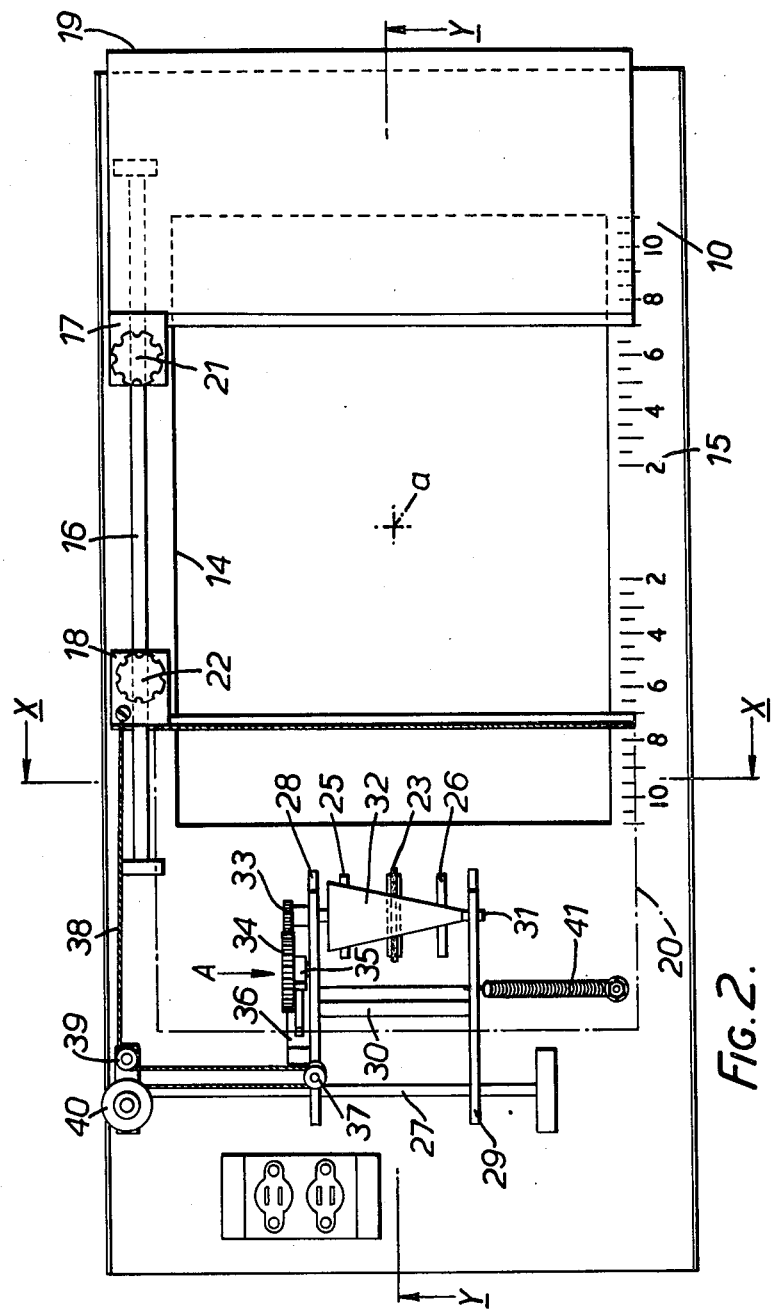
FIG. 2 is a top view of the exposure mask to a larger scale than FIG. 1.
Figure 5:
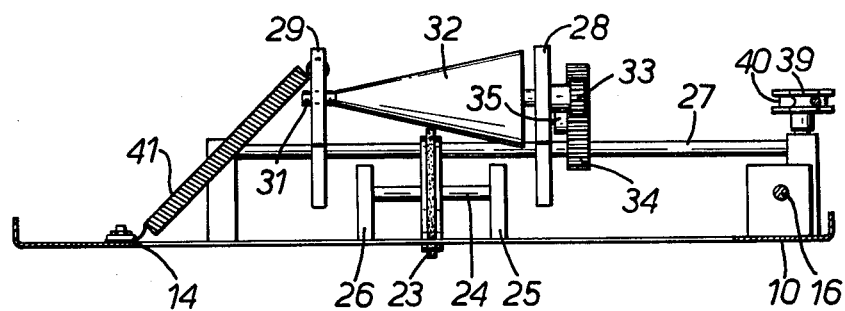
FIG. 5 is a cross-section on the line X—X of FIG. 2 to a larger scale than FIG. 2.
Figure 6:
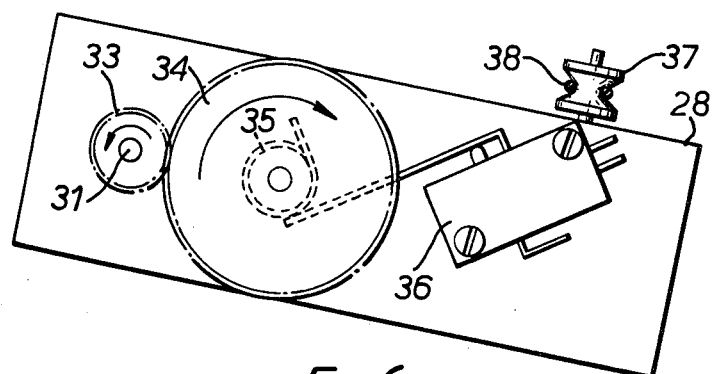
FIG. 6 is a fragmentary view in the direction of the arrow A of FIG. 2, to a larger scale than FIG. 2.

DETAILED DESCRIPTION OF THE PREFERRED EMBODIMENT:

Referring to the accompanying drawings, a paper transport unit 1 of a roll printing apparatus comprises a feed reel 2 and a motor-driven take-up reel 3. Photographic paper 4 to be exposed runs from the feed reel 2 by way of a paper guide 5 to an exposure plane 6 and thence by way of a further paper guide 7 and a tensioning roller 8 onto the takeup reel 3, with the coated side of the paper 4 facing upwards in the exposure plane 6. Immediately above the exposure plane 6 is placed the baseplate 10 of the exposure mask 9. The exposure mask is accurately positioned by conventional means in relation to the optical axis a of an exposure and imaging unit (not shown). The baseplate 10 of the paper mask 9 has a preferably rectangular light aperture 14, which is at least as large as the maximum size of image that is to be printed. For example, the length of the light aperture may be 28 cm and the width 20 cm. Along the length of the light aperture 14 a series of divisions is provided which, starting from the middle of the long side, for example, has continuous numbers going to the left and right (as seen in FIG. 2) so that a double measuring scale 15 is formed.

Above the long side of the light aperture 14 opposite to the measuring scale 15 runs a guide rod 16 which is suitably attached to the baseplate 10 and on which two sliding members 17 and 18 can be moved. Attached to each of the sliding members 17 and 18 is a covering member 19 or 20 (shown partly broken away), respectively, which when the mask 9 is placed on the paper web 4 extends just above the mask over the whole breadth of the light aperture 14 parallel to the plane of the paper web 4. In FIG. 2 the covering member 20 has been shown in outline by broken lines, and those parts of the mechanism that are under the covering member have been drawn as if the covering member was not present. The area of the light aperture can be altered by moving the sliding members 17 and 18 along the guide rod 16. Since the centre or zero point marked on the scale is level with the optical axis a of the imaging unit, a symmetrical adjustment of the print size can be obtained by displacing the covering members 19 and 20 symmetrically in relation to this centre point. The current position of the covering members 19 and 20 can be fixed by means of fixing screws 21 and 22 acting on the guide rod 16. Immediately adjacent to the light aperture 14 there is a measuring wheel 23 which is fixed to an axle 24, which is in turn guided in two bearings 25 and 26 fixed to the baseplate 10. The exposure mask 9 is preferably so constructed and arranged in the apparatus that the measuring wheel 23 is held in contact with the paper web 4 by the weight of the mask.

A second guide rod 27 extends across the baseplate 10, and has sliding on it two bearing plates 28 and 29 connected by a spacer 30. Each of the bearing plates 28 and 29 is slidably mounted at one end portion on the guide rod 27 and an axle 31 is journalled in the other end portions of the bearing plates. On the axle 31, which is parallel to the axle 24, is a conical roller 32, with its wide end towards the side of the mask bearing the guide rod 16, that rests on the wheel 23. On an end portion of the axle 31 that projects through the bearing plate 28 is a gearwheel 33, which meshes with a second, larger, gearwheel 34 mounted on the bearing plate 28. The second gearwheel 34 is provided with an actuator 35 that actuates a microswitch 36, also mounted on the bearing plate 28, whenever the second gearwheel passes through a particular angular position. On top of the bearing plate 28 near the second guide rod 27 is a pulley 37, round which passes a cord 38. Both ends of the cord 38 extend parallel to the second guide rod 27 roughly to the line of the first guide rod 16, where one end passes round a further pulley 39 and is anchored to the nearer of the sliding members 18. The other end of the cord 38 is wound onto a lockable pulley 40, by rotation of which the effective length of the cord can be adjusted.

A spring 41, acting in tension between the second bearing plate 29 and the baseplate 10 serves simultaneously to urge the roller 32 into frictional engagement with the wheel 23 are to urge the bearing plates 28 and 29 away from the pulleys 39 and 40, keeping the cord 38 taut.

In operation, the microswitch 36 is connected to the paper transport mechanism of the printing apparatus to stop paper transport when the microswitch is actuated, that is to say, whenever one revolution of the second gearwheel 34 has been completed. That will occur after a number of rotations of the measuring wheel 23 determined by the effective diameters of the measuring wheel, the roller 32, and the two gearwheels 33 and 34, that is to say, after the paper web 4 has moved a distance determined by the last three of those diameters. Because of the arrangement of the cord 38, the effective diameter of the roller 32 (which is its diameter at the point where it rolls on the wheel 23) varies linearly with the setting of the covering member 20. The ratio of the diameters of the gearwheels 33 and 34 and the cone-angle of the roller 32 are so selected that the length of paper 4 measured out between successive actuations of the microswitch 36 is equal to the length of the light aperture 14 between the covering members 19 and 20 (assuming the covering members to be symmetrically adjusted) plus a margin determined by the adjustment of the lockable pulley 40.

Thus, when the paper transport mechanism is switched on it will stop again automatically after the paper has been advanced by the correct amount for the mask setting selected, ready for the next exposure.

The switching operations described may, instead of being initiated by a micro-switch, be initiated by other switching means actuated by a switching member, for example by using electro-optical or magnetic effects. The exposure mask described may be used not only as a paper mask but also, in certain circumstances, as a film mask, for example in transparency printing apparatus with adjustable film size.

The term "transport" means any movement in the longitudinal direction of photographic material, irrespective of whether the material is pushed or pulled to move it. It may be seen that the mask of the present invention may also be provided with a second adjustable covering member with the system calibrated to provide the proper photographic material advance to accommodate the resulting size of the aperture.

What is claimed is:

1. An exposure mask for photographic material for automatically determining the distance such photographic material is advanced to match the distance advanced to the size of print being produced, said mask comprising:
   a. a positionable covering member forming an edge extending transversely of the direction of photographic material transport and defining an edge of an aperture through which light can reach said photographic material;
   b. a measuring wheel for rotation in response to the transport of said photographic material past the mask;
   c. switching means for stopping the transport of said photographic material;
   d. a switching member movable in a given ratio to the rotational movement of said measuring wheel for operating said switching means to stop the transport of said photographic material; and
   e. means responsive to the positioning of said covering member for establishing the ratio of movement of said switching member and said measuring wheel.

2. A mask as claimed in claim 1, wherein the switching member is driven by the measuring wheel through drive means including a drive wheel and a roller in rolling contact with each other, wherein radius of the roller varies along the length of the roller, and wherein the said adjustment of the said covering member causes relative movement of the roller and the drive wheel lengthwise of the roller.

3. A mask as claimed in claim 2, wherein the said drive wheel is the measuring wheel.

4. A mask as claimed in claim 2, wherein the roller tapers continuously from one end to the other.

5. A mask as claimed in claim 4 wherein the roller is frusto-conical.

6. A mask as claimed in any one of claims 3 to 5, wherein the roller is connected to the said covering member by a cord and is yieldably urged in a direction to maintain the cord taut.

7. A mask as claimed in claim 6, wherein the cord is guided over a pulley connected to the roller and extends away in the same direction from both sides of the pulley, and wherein one end is connected to an anchorage and the other is guided over a further pulley and connected to the covering member.

8. A mask as claimed in any one of claims 1,2,3, 4 or 5 wherein a second edge of the said aperture opposite to the first said edge is defined by a second adjustable covering member, and wherein the arrangement is such that when the two covering members are adjusted symmetrically with one another the change in the length of the advanced photographic material is equal to the change in the length of the said aperture between the two said covering members.

9. A photographic printing apparatus comprising an exposure mask as claimed in any one of claims 1, 2, 3, 4, or 5 means to project an image onto photographic material through the aperture, and means arranged to transport photographic material past the aperture, the arrangement being such that in use the transport means is rendered inoperative in response to the operation of the switching means by the switching member.

* * * * *